United States Patent
Fermum et al.

(10) Patent No.: US 10,134,159 B1
(45) Date of Patent: Nov. 20, 2018

(54) DATA-MODEL-DRIVEN VISUALIZATION OF DATA SETS

(71) Applicant: INTUIT INC., Mountain View, CA (US)

(72) Inventors: Olaf Fermum, Mountain View, CA (US); Timothy M. Chaney, Walnut Creek, CA (US); Reid D. Burkhardt, San Diego, CA (US); Brian J. Tharp, San Jose, CA (US)

(73) Assignee: INTUIT INC., Mountain View, CA (US)

( * ) Notice: Subject to any disclaimer, the term of this patent is extended or adjusted under 35 U.S.C. 154(b) by 178 days.

(21) Appl. No.: 13/946,542

(22) Filed: Jul. 19, 2013

(51) Int. Cl.
*G06F 17/30* (2006.01)
*G06T 11/20* (2006.01)

(52) U.S. Cl.
CPC ...... *G06T 11/206* (2013.01); *G06F 17/30554* (2013.01); *G06F 17/30572* (2013.01); *G06F 17/30592* (2013.01)

(58) Field of Classification Search
CPC .. G06F 9/4443; G06F 3/048; G06F 17/30716; G06T 11/206
See application file for complete search history.

(56) References Cited

U.S. PATENT DOCUMENTS

| | | | |
|---|---|---|---|
| 6,707,454 B1* | 3/2004 | Barg | G06F 17/246 345/440 |
| 2006/0206512 A1* | 9/2006 | Hanrahan et al. | 707/102 |
| 2008/0162209 A1* | 7/2008 | Gu | G06Q 10/0637 |
| 2014/0040806 A1* | 2/2014 | Anderson | G06F 17/245 715/771 |

* cited by examiner

*Primary Examiner* — Gregory J Tryder
*Assistant Examiner* — Scott E Sonners
(74) *Attorney, Agent, or Firm* — Patterson + Sheridan, LLP (57) ABSTRACT

The disclosed embodiments provide a system that processes data. During operation, the system obtains a data set and metadata corresponding to a data model, wherein the data model includes a metric and a set of dimensions associated with the metric. Next, the system applies a set of rules to the data set to obtain a deconstruction of the metric by the set of dimensions. Finally, the system displays the deconstruction in one or more charts to a user independently of a domain of the data set.

12 Claims, 8 Drawing Sheets

DATA-MODEL-DRIVEN VISUALIZATION OF DATA SETS

BACKGROUND

Field

The disclosed embodiments relate to techniques for processing data. More specifically, the disclosed embodiments relate to techniques for providing data-model-driven visualization of data sets.

Related Art

Data visualizations are commonly used to facilitate a user's understanding of data. For example, interactive charts may present relationships, trends, patterns, and/or other attributes related to large sets of complex, interconnected, and/or multidimensional data to the user in a clear and concise manner.

However, existing data visualization mechanisms are associated with a tradeoff between ease of use and flexibility. First, sophisticated data visualization tools may allow users to view graphical representations of various types of data but may also require the users to have detailed understandings of both the tools and the data models for the data. For example, a user may generate a data visualization through a general-purpose data visualization application by manually running queries for specific types of data and configuring the display of charts containing the data based on relationships among the queried data.

Second, domain-specific data visualization tools may be relatively easy to use but may be designed around and/or limited to specific data models. For example, a financial data visualization application may allow a user to easily view and interact with graphs, charts, and/or other types of information related to financial market data but may not be able to process and/or display other types of data, additional dimensions associated with the financial data, and/or additional relationships among the financial market data.

Consequently, understanding of large, varied, and/or complex data sets may be facilitated by mechanisms for improving the flexibility and ease of use of data visualization tools.

SUMMARY

The disclosed embodiments provide a system that processes data. During operation, the system obtains a data set and metadata corresponding to a data model, wherein the data model includes a metric and a set of dimensions associated with the metric. Next, the system applies a set of rules to the data set to obtain a deconstruction of the metric by the set of dimensions. Finally, the system displays the deconstruction in one or more charts to a user independently of a domain of the data set.

In some embodiments, the system also displays a trend for the metric in the one or more charts.

In some embodiments, the system also updates the one or more charts based on a time dimension of the metric.

In some embodiments, the time dimension is associated with one or more granularities.

In some embodiments, the system also displays a breakdown of the trend by a dimension from the set of dimensions in the one or more charts.

In some embodiments, the system also provides the set of dimensions as a set of options associated with the breakdown of the trend to the user. Next, the system obtains, from the user, a selection of the dimension prior to displaying the breakdown of the trend by the dimension.

In some embodiments, obtaining the data set and metadata for the data model involves obtaining the metric and the set of dimensions from the metadata, and obtaining data associated with the metric and the set of dimensions.

In some embodiments, the one or more charts include at least one of a line chart, a bar chart, and a pie chart.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
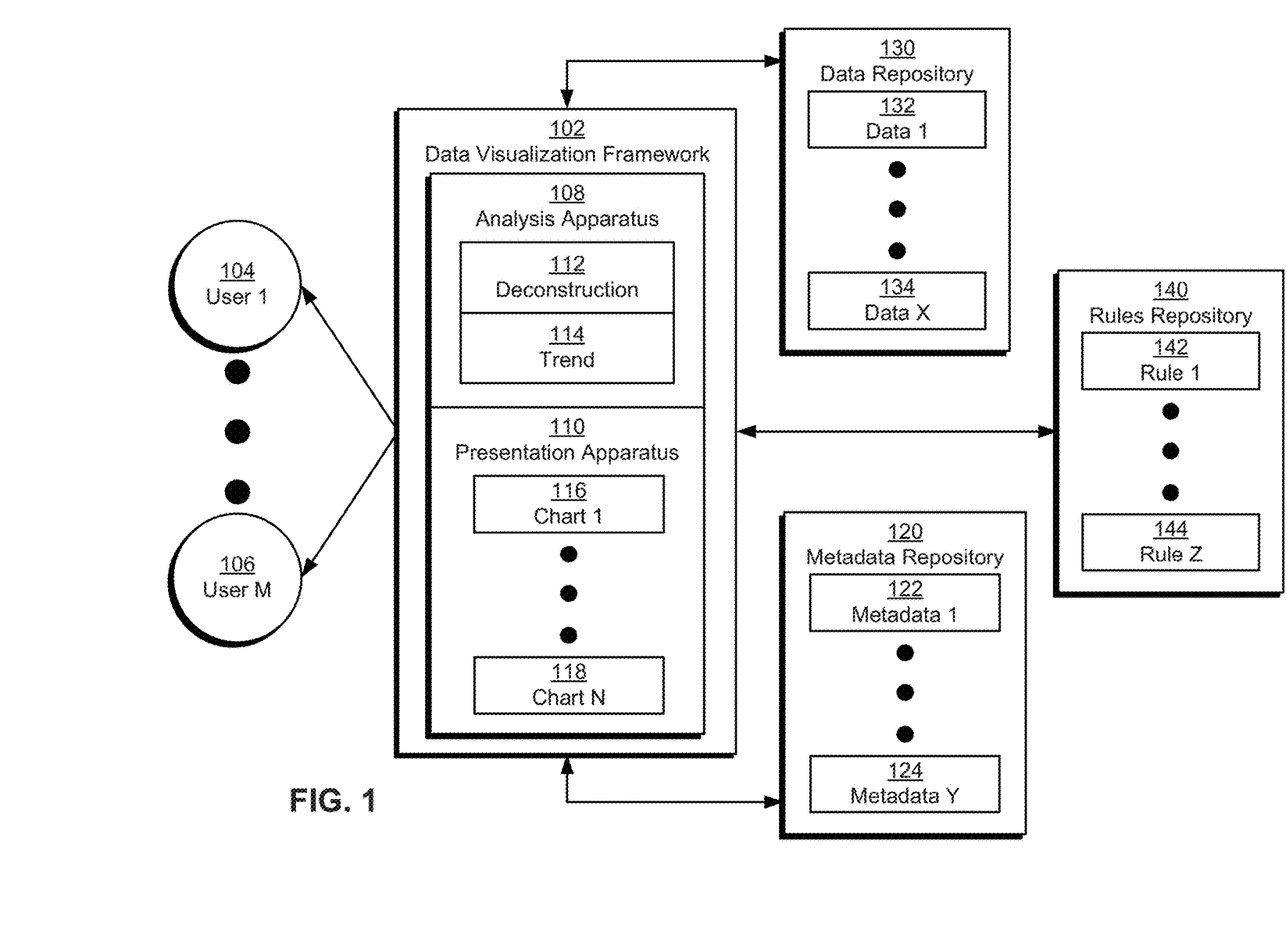
FIG. 1 shows a schematic of a system in accordance with the disclosed embodiments.

The disclosed embodiments relate to a method and system for processing data. As shown in FIG. 1, the system may correspond to a data visualization framework 102 that is accessed by a set of users (e.g., user 1 104, user m 106). Data visualization framework 102 includes an analysis apparatus 108 and a presentation apparatus 110. Each of the components of data visualization framework 102 is described below.

In one or more embodiments, data visualization framework 102 provides data-model-driven visualization of data sets to the users. For example, data visualization framework 102 may allow the users to view graphical representations of different types of data without requiring the users to be familiar with the structure, definition, and/or values of the data. Each data set may be associated with metadata (e.g., metadata 1 122, metadata y 124) that describes a data model of the data set. In turn, the metadata may be used to identify data that is relevant to the data model and thus should be included in the data set. A set of rules (e.g., rule 1 142, rule z 144) may then be applied to the data set to provide one or more visualizations of the data set independently of the domain of the data set.

More specifically, analysis apparatus 108 may obtain a request associated with the data set from a user. The request may specify the name and/or type of the data set and/or other information related to the data set. For example, the user may identify a keyword, category, group, and/or other information that may be used to identify and/or restrict the data set. Analysis apparatus 108 may use the information to retrieve the metadata for the data set from a metadata repository 120 by, for example, performing a query for metadata matching the information.

Next, analysis apparatus 108 may use the metadata to identify the data model for the data set, including a metric and a set of dimensions associated with the metric. In other words, analysis apparatus 108 may obtain a star schema, snowflake schema, and/or other representation of the data model from the metadata. Once the metric and set of dimensions are obtained from the metadata, analysis apparatus 108 may obtain data (e.g., data 1 132, data x 134) associated with the metric and set of dimensions from a data repository 130. For example, analysis apparatus 108 may use the metadata to perform one or more queries with one or more databases containing data associated with the metadata.

Analysis apparatus 108 may also obtain a set of rules from a rules repository 140 and apply the rules to the metadata to obtain a deconstruction 112 of the metric by the set of dimensions, as well as a trend 114 for the metric. Deconstruction 112 may split the metric along one or more dimensions, and trend 114 may indicate changes to the metric over time.

Presentation apparatus 110 may then display deconstruction 112 and/or trend 114 in one or more charts (e.g., chart 1 116, chart n 118) to the user. For example, presentation apparatus 110 may generate and display the charts based on the application of rules in rules repository 140 to the data and/or metadata. As a result, the graphical representations of data shown within presentation apparatus 110 may change as rules are added, modified, and/or removed from rules repository 140.

Presentation apparatus 110 may further enable interaction with and/or configuration of the charts by the user. For example, presentation apparatus 110 may allow the user to view deconstruction 112 and/or trend 114 using different timescales and/or granularities of a time dimension for the metric. Presentation apparatus 110 may also allow the user to specify a dimension associated with the metric and view a breakdown of trend 114 by the dimension. Viewing of and/or interaction with charts for data-model-independent visualization of data sets is discussed in further detail below with respect to FIGS. 3A-3B and FIGS. 4A-4B.

Consequently, data visualization framework 102 may provide a flexible, configurable, and/or easy-to-use mechanism for viewing and understanding large, complex, and/or varied data sets. For example, data visualization framework 102 may allow the user to access and view charts for different types of data without using a complex, general-purpose data visualization tool and/or acquiring in-depth knowledge of the data's domain and/or data model (e.g., metric and/or dimensions). Data visualization framework 102 may thus reduce the overhead associated with using conventional general-purpose data visualization tools while providing increased flexibility and/or customization of data visualizations (e.g., charts) over those of domain-specific data visualization mechanisms.

Those skilled in the art will appreciate that the system of FIG. 1 may be implemented in a variety of ways. First, analysis apparatus 108, presentation apparatus 110, metadata repository 120, data repository 130, and rules repository 140 may be provided by a single physical machine, multiple computer systems, one or more virtual machines, a grid, one or more databases, one or more filesystems, and/or a cloud computing system. In addition, analysis apparatus 108 and presentation apparatus 110 may be implemented together and/or separately by one or more hardware and/or software components and/or layers.

Second, data, metadata, and/or rules associated with data visualization framework 102 may be stored, defined, and/or transmitted using a number of techniques. For example, data visualization framework 102 may be configured to accept data, metadata, and/or rules from different types of repositories, including relational databases, graph databases, data warehouses, filesystems, and/or flat files. Data visualization framework 102 may also obtain and/or transmit data, metadata, and/or rules in a number of formats, including database records, property lists, Extensible Markup language (XML) documents, JavaScript Object Notation (JSON) objects, and/or other types of structured data.

Figure 2:
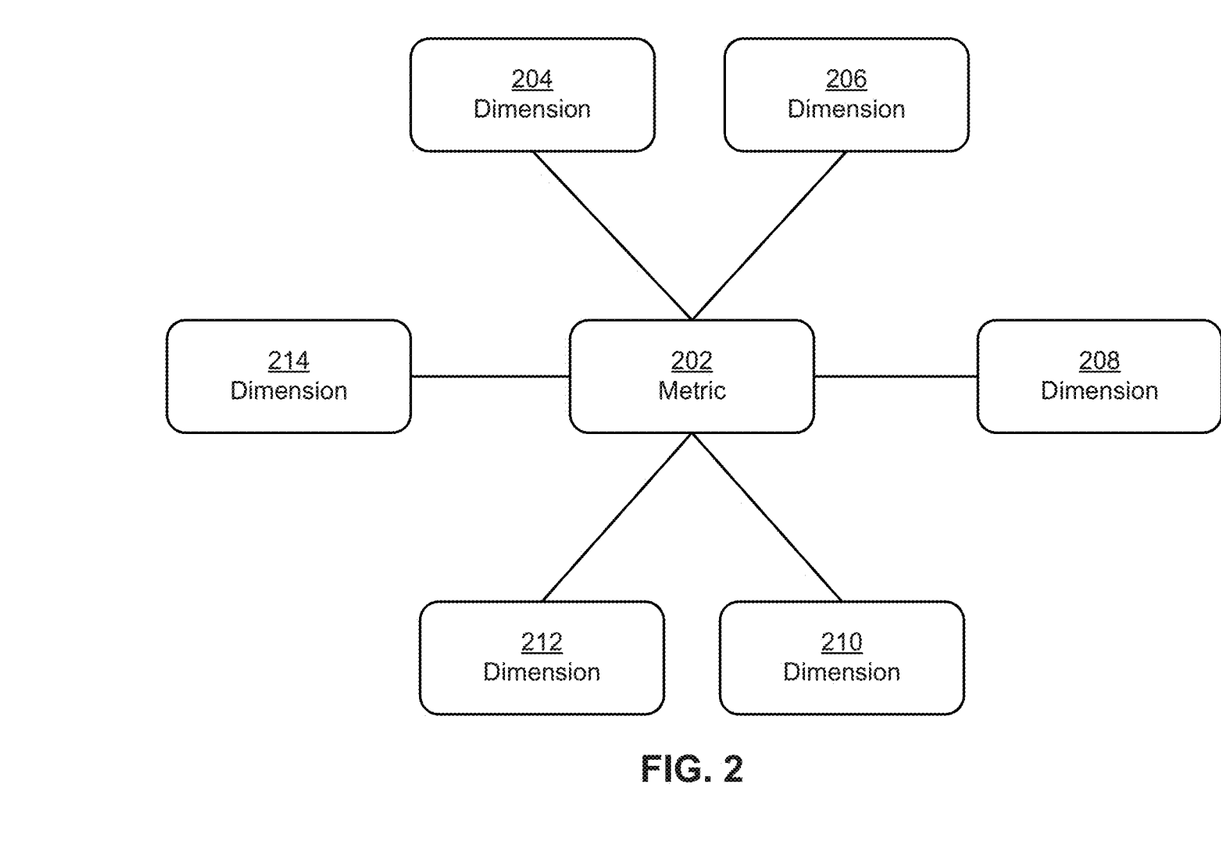
FIG. 2 shows a data model in accordance with the disclosed embodiments.

FIG. 2 shows a data model in accordance with the disclosed embodiments. As shown in FIG. 2, the data model includes a metric 202 and a set of dimensions 204-214 associated with metric 202. In other words, metric 202 and dimensions 204-214 may correspond to a star schema for a data set.

Metric 202 may represent the measurable and/or quantitative aspect of the data set. As a result, data associated with metric 202 may include one or more numeric quantities. For example, metric 202 may correspond to a sales price, a sale quantity, a quantity, a number of page views, a distance, a weight, a rating, and/or a temperature. In addition, records associated with metric 202 may be associated with specific events, points in time, and/or periods of time. For example, numeric values associated with metric 202 may be obtained at events that potentially affect the values, at periodic intervals (e.g., daily, weekly, monthly, etc.) that are generally independent of the values, and/or as cumulative measurements (e.g., averages, sums, etc.) over the periodic intervals.

Dimensions 204-214 may categorize, characterize, group, and/or label otherwise unordered values for metric 202. Each dimension 204-214 may include a set of limited and/or fixed possible values. For example, dimensions 204-214 may specify a person's country, state, and/or city of residence; a computer's operating system; a model of a car, electronic device, and/or appliance; a passing or failing of a test; a name of a product; an age range; and/or a language. In addition, each value of metric 202 may be associated with a set of values for dimensions 204-214. For example, a record containing a value of a metric for a sale price may also include values for a product, sales promotion, market, and/or customer associated with the sale price.

To enable identification of trends associated with metric 202, dimensions 204-214 may also include a time dimension that orders and/or groups values for metric 202 by date, time, and/or time period. The time dimension may also be associated with different granularities. For example, the time dimension may be associated with timestamps and/or time intervals that are per second, minute, hour, day, week, month, quarter, and/or year.

As mentioned above, the data model may be defined and/or described using metadata. The metadata may thus specify and/or define metric 202, dimensions 204-214, and/or granularities associated with one or more dimensions 204-214. For example, metadata for a "Page Views" metric may include the following:

```
"metrics": [
  {
    "id": "1",
    "displayName": "Page Views",
    "description": "The count of web pages loaded
    to a visitor's browser
    (includes page refreshed, reloaded and pulled
    from a cache). The number of page views
    is measured additively over time.",
    "additive": "Y",
    "units": "1",
    "dimensions": [
      "1",
      "4",
      "12"
    ],
    "availability": [
      {
        "biz": "1",
        "grain": "1",
        "date": "2010-10-01",
        "lastDate": "2012-05-22"
      },
    "units": [
      {
        "id": "1",
        "displayName": "Count"
      },
      {
        "id": "2",
        "displayName": "Seconds"
      },
      {
        "id": "3",
        "displayName": "Precent"
      },
      {
        "id": "4",
        "displayName": "Dollars"
      },
      {
        "id": "5",
        "displayName": "Average"
      },
      {
        "id": "6",
        "displayName": "Rank"
      }
    ],
    "dimensions": [
```

-continued

```
      {
        "id": "1",
        "displayName": "Browser",
        "enumerations": {
          "-1": "Unknown",
          "0": "All",
          "1": "Internet Explorer",
          "2": "Other",
          "3": "Firefox",
          "4": "Safari",
          "5": "Chrome"
        }
      },
      {
        "id": "4",
        "displayName": "Operating System",
        "enumerations": {
          "-1": "Unknown",
          "0": "All",
          "1": "Other",
          "2": "Unix / Linux",
          "4": "Mac",
          "5": "iOS Phone",
          "6": "Windows"
        }
      },
      {
        "id": "12",
        "displayName": "Page Type",
        "enumerations": {
          "-1": "Unknown",
          "0": "All",
          "1": "Marketing",
          "2": "Product",
          "3": "Customer Care"
        }
      },
  "bizHierarchy": [
    {
      "id": "1",
      "displayName": "Intuit",
      "type": "corp",
      "children": [
        {
          "id": "27",
          "displayName": "APD",
          "type": "franchise",
          "children": [
            {
              "id": "31",
              "displayName": "Acct Solns",
              "type": "BU",
              "children": [
                {
                  "id": "32",
                  "displayName":
                  "Professional Advisors Program",
                  "type": "offering"
                },
                {
                  "id": "33",
                  "displayName":
                  "QB Accountant Edition",
                  "type": "offering"
                }
              ]
            },
  "grains": [
    {
      "id": "1",
      "displayName": "Daily"
    },
    {
      "id": "2",
      "displayName": "Weekly"
    },
    {
      "id": "3",
      "displayName": "Monthly"
```

```
        },
        {
            "id": "4",
            "displayName": "Quarterly"
        }
    ]
```

Within the metadata, the "Page Views" metric includes a description of "The count of web pages loaded to a visitor's browser (includes page refreshed, reloaded and pulled from a cache). The number of page views is measured additively over time." The metric may also be additive and have numeric values with units of "Count." The metric is associated with three dimensions, all of which may have possible values of "Unknown" and a value of "All." The "Browser" dimension also includes possible values of "Internet Explorer," "Other," "Firefox," "Safari," and "Chrome." The "Operating System" dimension includes possible values of "Other," "Unix/Linux," "Mac," "iOS Phone," and "Windows." The "Page Type" dimension includes possible values of "Marketing," "Product," and "Customer Care."

The metadata also includes a "bizHierarchy" element that describes a business hierarchy associated with the metric. The business hierarchy includes a parent of "Intuit" with a child of "APD," which in turn has children named "Acct Solns," "Professional Advisors Program," and "QB Accountant Edition." The business hierarchy may provide additional context for the data associated with the metric and dimensions.

Finally, the metadata includes a set of "grains" describing different granularities of time, including "Daily," "Weekly," "Monthly," and "Quarterly." Values of the "Page Views" metric may be accumulated (e.g., added) within time intervals represented by each granularity to enable viewing and/or grouping of the metric and/or associated dimensions at the granularity.

Figure 3A:
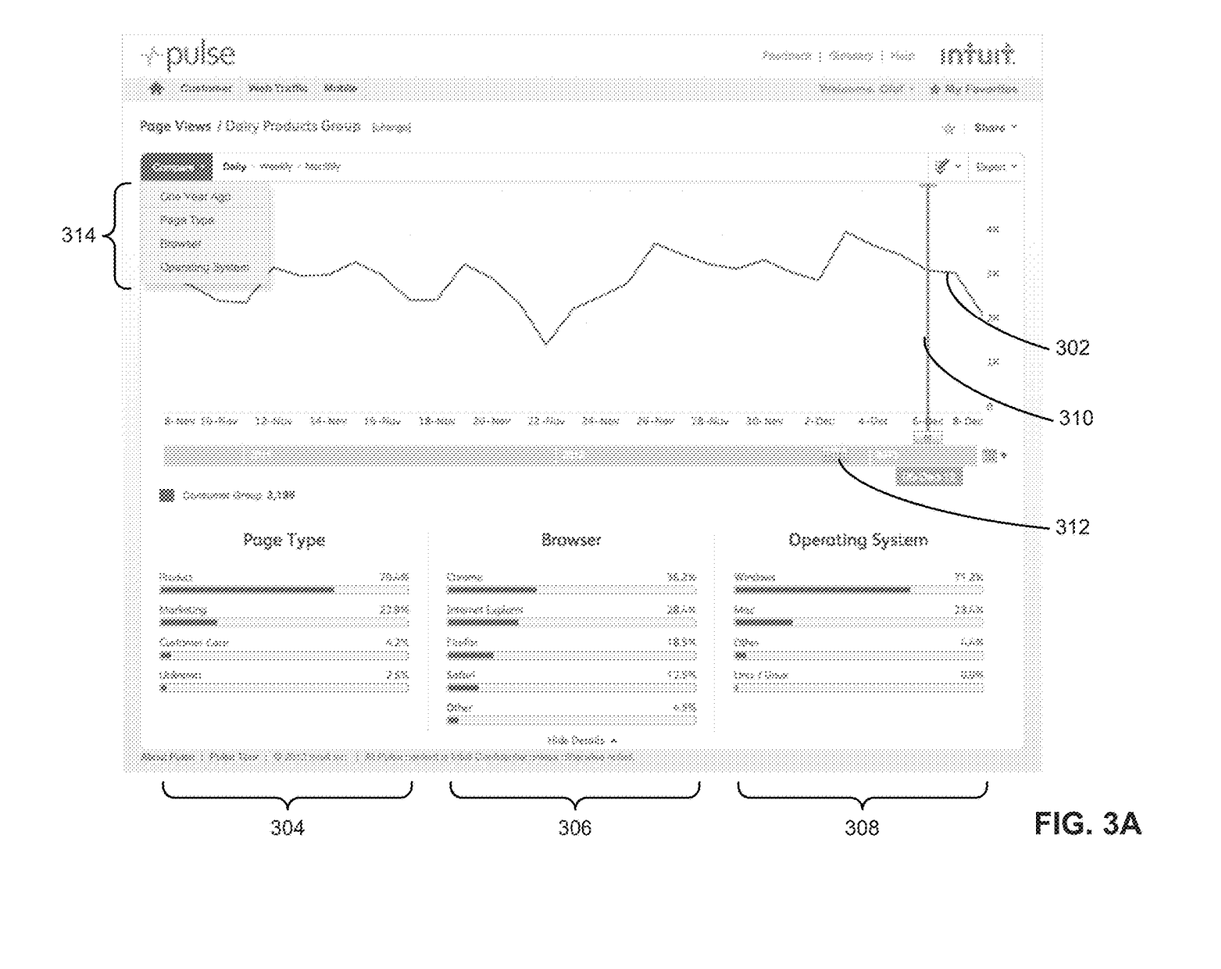
FIG. 3A shows an exemplary screenshot in accordance with the disclosed embodiments.

FIG. 3A shows an exemplary screenshot in accordance with the disclosed embodiments. More specifically, FIG. 3A shows a screenshot of a user interface for displaying data-model-driven visualizations of data sets. As mentioned above, the user interface may include one or more charts that facilitate understanding of a data set by a user independently of the data model and/or domain of the data set.

In particular, the user interface of FIG. 3A may display a line chart of a trend 302 for a "Page Views" metric at a "Dairy Products Group" level of a business hierarchy. The user interface may also display a set of charts containing a deconstruction of the metric by a set of dimensions 304-308. Trend 302 may span a month and show changes in the value of the metric over the course of the month. Within the chart for trend 302, the user interface may provide a slider 310 for selecting a particular date under which the metric is to be deconstructed.

After a date is specified using slider 310, the user interface may display a set of bar charts representing the frequencies of values for dimensions 304-308 under that date as a set of percentages associated with the values. For example, the user interface may show a split of a "Page Type" metric 304 into percentages of possible values of "Product," "Marketing," "Customer Care," and "Unknown." The user interface may also show a split of a "Browser" metric 306 into percentages of possible values of "Chrome," "Internet Explorer," "Firefox," "Safari," and "Other." Finally, the user interface may show a split of an "Operating System" metric 308 into percentages of possible values of "Windows," "Mac," "Other," and "Unix/Linux."

If no date is specified, slider 310 may be set to the latest available date in the time interval. The dates and/or time interval covered by the chart may also be adjusted by manipulating a scrollbar 312 underneath the chart for trend 302. In other words, the user interface of FIG. 3A may provide views of trend 302 and the deconstruction of trend 302 into dimensions 304-308 along different timescales, time periods, and/or granularities.

Furthermore, the user interface may provide a set of options 314 associated with dimensions 304-308 and/or other dimensions for the metric. The user may select one of the displayed options 314 to view a breakdown of the metric by the corresponding dimension, as discussed in further detail below with respect to FIG. 3B.

Figure 3B:
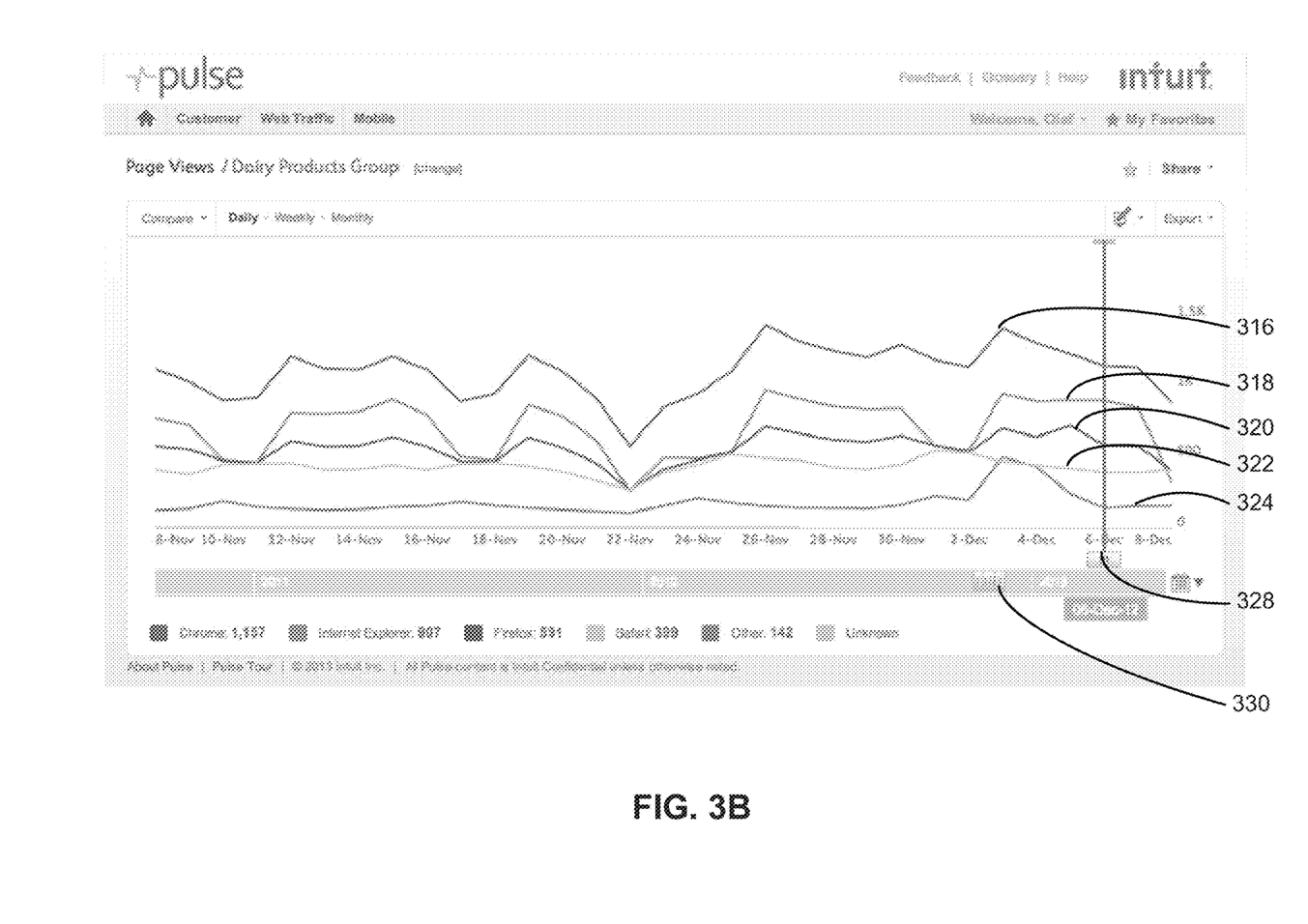
FIG. 3B shows an exemplary screenshot in accordance with the disclosed embodiments.

FIG. 3B shows an exemplary screenshot in accordance with the disclosed embodiments. More specifically, FIG. 3B shows a screenshot of the user interface of FIG. 3A after the user has selected the "Browser" dimension under options 314. In response to the selection, the user interface may show a line chart containing a breakdown of the "Page Views" metric by the "Browser" dimension along the same date range as the line chart containing trend 302 in FIG. 3A.

Within the line chart of FIG. 3B, different color-coded lines 316-324 are shown to indicate the frequencies of different possible values for the "Browser" dimension within the metric over the date range. For example, line 316 may represent the change in frequency of the "Chrome" value, line 318 may represent the change in frequency of the "Internet Explorer" value, and line 320 may represent the change in frequency of the "Firefox" value. Line 322 may represent the change in frequency of the "Safari" value, and line 324 may represent the change in frequency for the "Other" value. The user may use the line chart to compare changes in the occurrence of different possible values of the metric over time.

As with the user interface of FIG. 3A, the user interface of FIG. 3B may provide a slider 328 for specifying a particular point in time (e.g., date) along the date range and/or a scrollbar 330 for adjusting the date range of the line chart. Below the line chart, the user interface may provide numeric data representing the frequencies of the values for the dimension at the specified point in time.

Figure 4A:
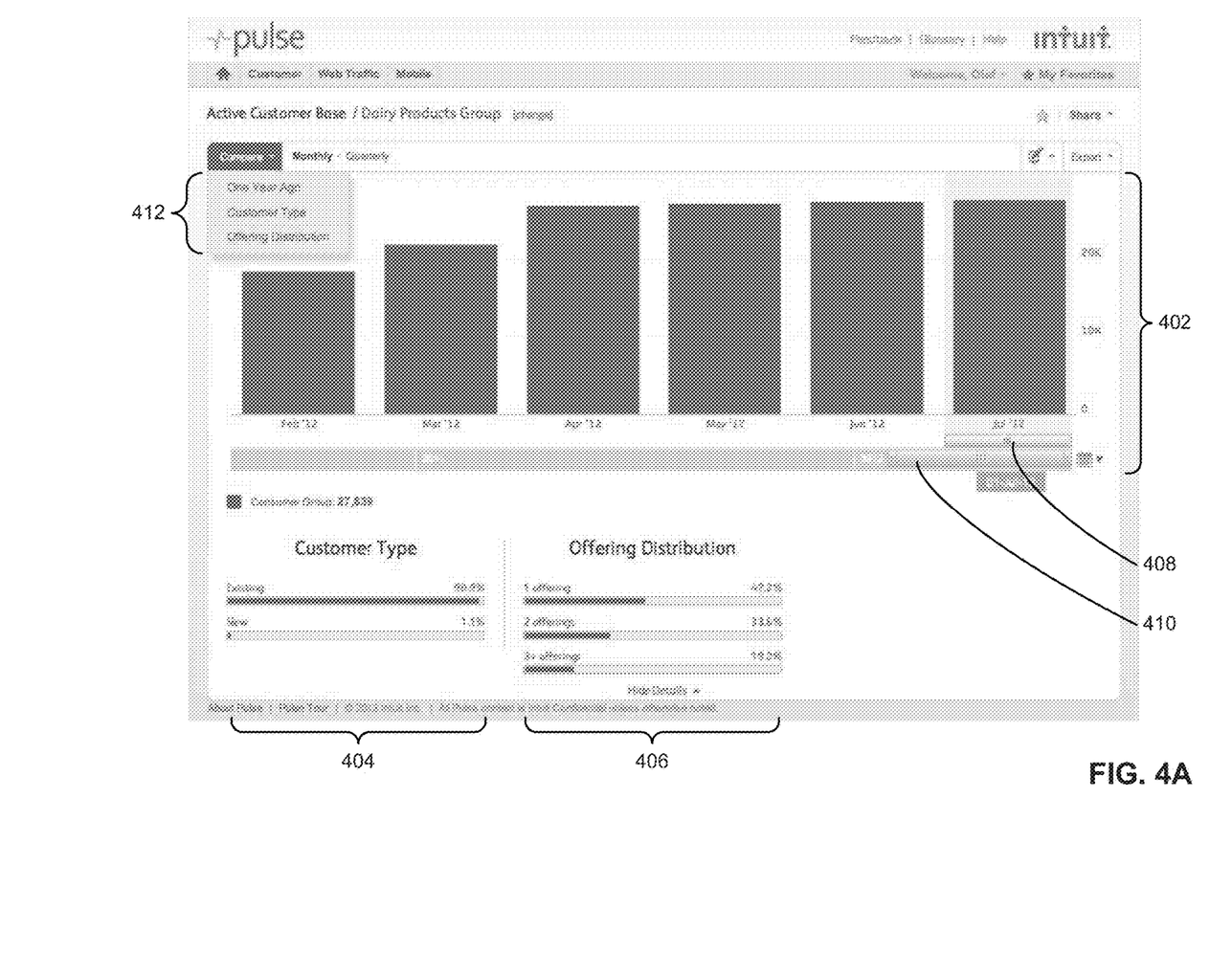
FIG. 4A shows an exemplary screenshot in accordance with the disclosed embodiments.

FIG. 4A shows an exemplary screenshot in accordance with the disclosed embodiments. In particular, FIG. 4A shows a screenshot of a user interface for displaying data-model-independent visualizations of data sets. Like the user interface of FIG. 3A, the user interface of FIG. 4A shows a set of charts containing a trend 402 for a metric and a deconstruction of the metric into a set of dimensions 404-406. For example, trend 402 may show the change over time in the value of an "Active Customer Base" metric for a "Dairy Products Group" level of a business hierarchy.

However, the user interface of FIG. 4A shows trend 402 in a bar chart instead of a line chart. In addition, the date range of the bar chart spans six months, and the granularity of trend 402 is monthly instead of daily. The display of trend 402 in the bar chart may be based on metadata for the trend and/or a set of rules applied to the metadata to generate trend 402. For example, trend 402 may be displayed in a bar chart and not a line chart because a relatively coarse granularity is specified for a time dimension of the metric and/or values for the metric may only be shown within a relatively short date range.

A slider 408 may be positioned below a month in the bar chart, and the deconstruction may show a set of bar charts representing the frequencies of values for dimensions 404-406 during that month as percentages associated with the values. For example, the user interface may show a split of a "Customer Type" dimension into percentages of possible values of "Existing" and "New" and a split of an "Offering Distribution" dimension into percentages of possible values of "1 offering," "2 offerings," and "3+ offerings."

The date range of trend 402 may also be adjusted using a scrollbar 410 below the bar chart containing trend 402. For example, the date range may be expanded by increasing the size of the scrollbar and reduced by reducing the size of the scrollbar. The scrollbar may also be dragged horizontally across the user interface to display data for the metric and/or dimensions 404-406 between different start and end points of the date range.

Finally, a set of options 412 associated with dimensions of the metric may be shown. After a user selects one of the options, the user interface may show a breakdown of trend 402 by the dimension corresponding to the selected option, as discussed in further detail below with respect to FIG. 4B.

Figure 4B:
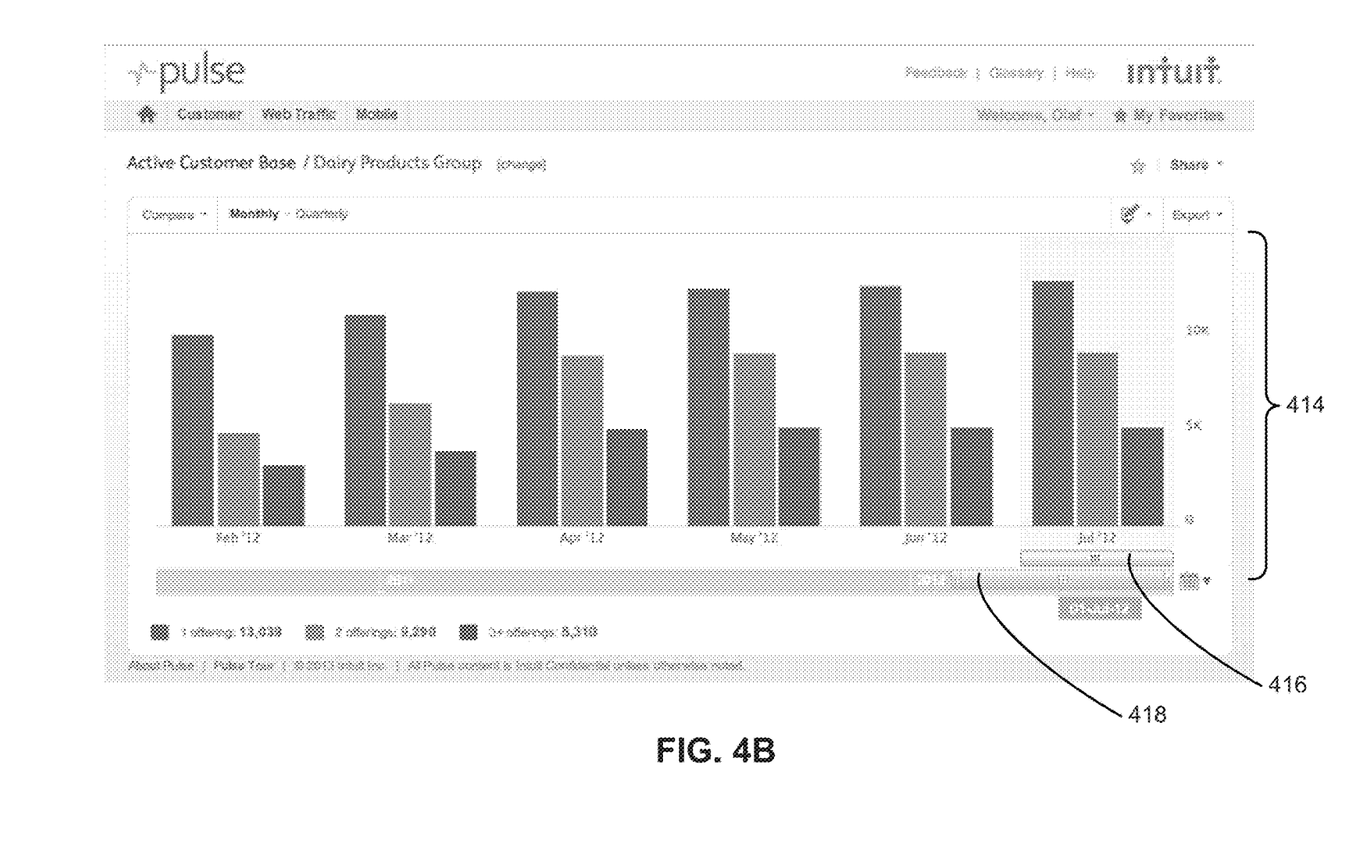
FIG. 4B shows an exemplary screenshot in accordance with the disclosed embodiments.

FIG. 4B shows an exemplary screenshot in accordance with the disclosed embodiments. In particular, FIG. 4B shows a screenshot of the user interface of FIG. 4A after the user has selected the "Offering Distribution" dimension under options 412. As shown in FIG. 4B, a breakdown 414 of trend 402 by the dimension is included in a bar chart with the same date range as the bar chart containing trend 402 in FIG. 4A. For example, each month in the date range may include three bars instead of one, with the leftmost bar representing the frequency of the "1 offering" value, the middle bar representing the frequency of the "2 offerings" value, and the rightmost bar representing the frequency of the "3+ offerings" value.

A slider 416 may also be used to specify a month in the date range, and numeric data for the frequencies of the values during the month may be shown below the bar chart. Slider 416 may be positioned over the most recent month in the date range by default. Finally, a scrollbar 418 is shown below the bar chart to enable adjustment of the length of the date range and/or the endpoints of the date range.

Figure 5:
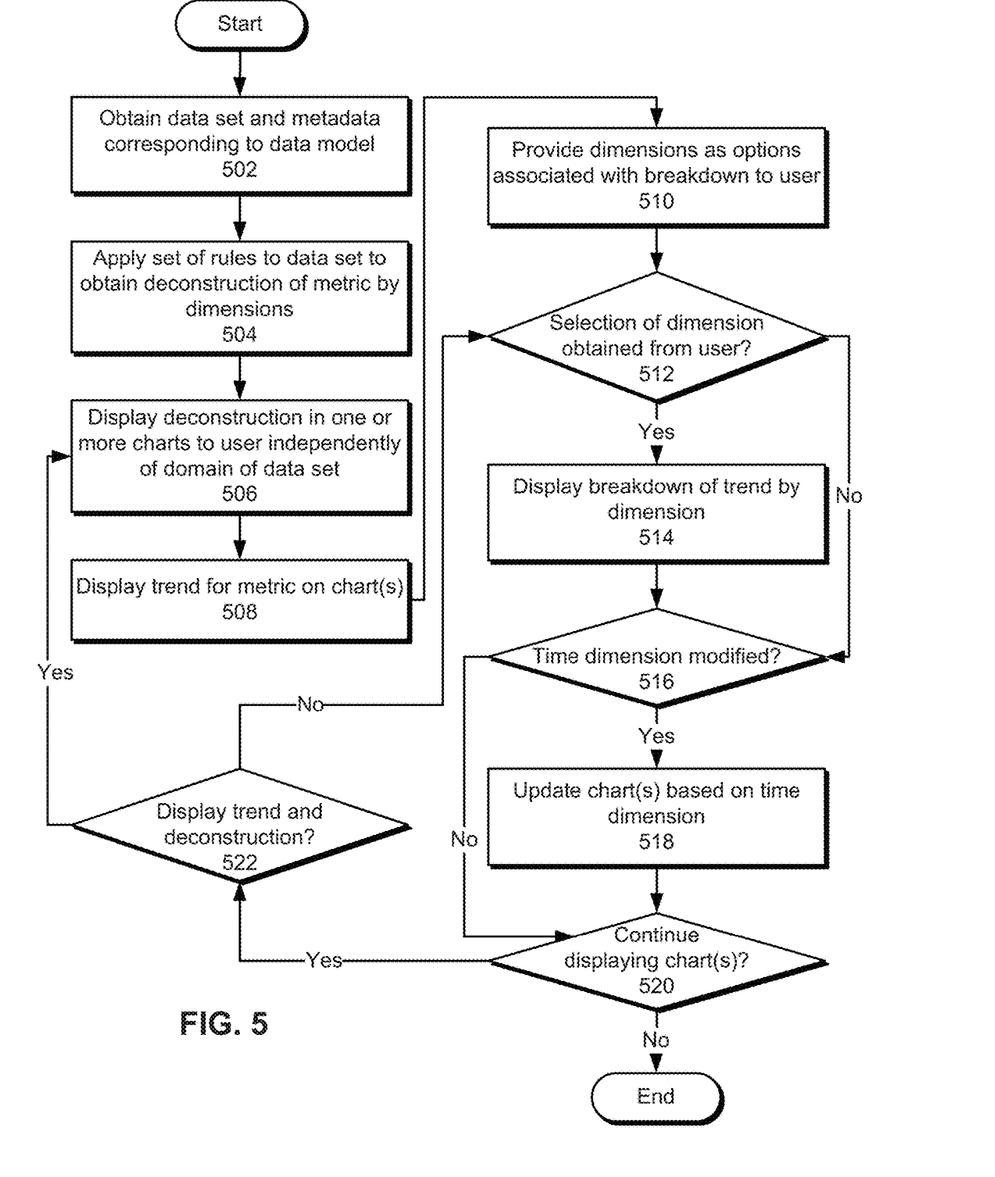
FIG. 5 shows a flowchart illustrating the processing of data in accordance with the disclosed embodiments.

FIG. 5 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, a data set and metadata corresponding to a data model are obtained (operation 502). The metadata may specify a metric and a set of dimensions associated with the metric. After the metric and dimensions are obtained from the metadata, data associated with the metric and the dimensions may be obtained (e.g., from a data repository).

Next, a set of rules is applied to the data set to obtain a deconstruction of the metric by the dimensions (operation 504). For example, the rules may be used to determine a numeric and/or percentage split of the metric along the dimensions for different time intervals, points in time, and/or granularities. The deconstruction and a trend for the metric are then displayed in one or more charts to a user independently of the domain of the data set (operations 506-508). The charts may include line charts, bar charts, pie charts, and/or other visualizations of data associated with the metric and dimensions.

The dimensions are also provided as options associated with a breakdown of the trend to the user (operation 510), and a selection of a dimension may be obtained from the user (operation 512). If the user has not selected a dimension from the options, the chart(s) may continue to include the trend and deconstruction. If the user has selected a dimension from the options, a breakdown of the trend by the dimension may be shown (operation 514), in lieu of or in addition to the trend and/or deconstruction.

A time dimension associated with the metric may be modified (operation 516). For example, the user may modify the time dimension by adjusting a slider, scrollbar, and/or other user-interface element associated with the timescale of the chart(s). If the time dimension is not modified, the deconstruction, trend, and/or breakdown may continue to be displayed as-is within the chart(s). If the time dimension has been modified, the display of the trend, deconstruction, and/or breakdown may be updated based on the time dimension (operation 518). For example, the time interval, granularity, and/or point in time associated with the trend and/or deconstruction may be updated to reflect one or more changes to the time dimension.

The chart(s) may continue to be displayed (operation 520) to the user during visualization of the data set by the user. If the charts(s) are to be displayed, the trend and deconstruction may be displayed (operation 522). If the trend and deconstruction are to be displayed, the trend and deconstruction are shown within the charts (operation 506-508), and the dimensions are provided as options associated with the breakdown (operation 510). If the trend and deconstruction are not to be displayed, a breakdown of the trend by a dimension may be displayed in the chart(s) based on a current and/or previous selection of the dimension by the user (operations 512-514). The chart(s) may also be updated based on modifications to the time dimension (operations 516-518). Display of the trend, deconstruction, and/or breakdown within the chart(s) may continue (operation 520) until visualization of the data set is no longer being provided to the user.

Figure 6:
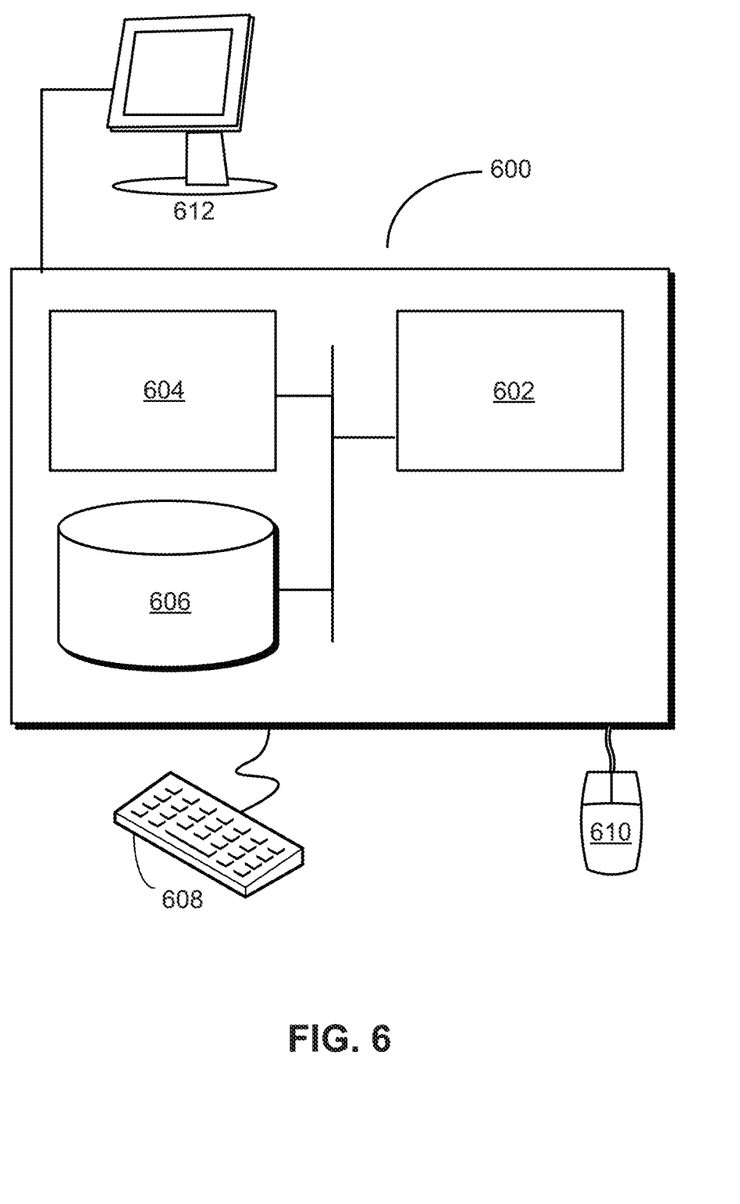
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for processing data. The system may include an analysis apparatus that obtains a data set and metadata corresponding to a data model. The data model may include a metric and a set of dimensions associated with the metric. Next, the analysis apparatus may apply a set of rules to the data set to obtain a deconstruction of the metric by the set of dimensions. The system may also include a presentation apparatus that displays the deconstruction, a trend for the metric, and/or a breakdown of the trend by one of the dimensions in one or more charts to a user independently of a domain of the data set.

In addition, one or more components of computer system 600 may be remotely located and connected to the other components over a network. Portions of the present embodiments (e.g., analysis apparatus, presentation apparatus, etc.) may also be located on different nodes of a distributed system that implements the embodiments. For example, the present embodiments may be implemented using a cloud computing system that provides visualizations of various types of data to a set of remote users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for a computer to provide data-model-driven visualization of data sets, the method comprising:
    receiving a request that includes information related to a data set;
    performing a first query against a metadata repository to obtain metadata matching the information, wherein the metadata comprises:
        a metrics section that comprises an identifier for a metric, the metric representing a measurable quantity in the data set, and a set of dimension identifiers, each of the dimension identifiers corresponding to a different dimension in a set of dimensions for the metric, wherein each of the different dimensions groups values for the metric in the data set and wherein the set of dimensions does not include a time dimension; and
        a dimensions section that comprises, for each dimension in the set of dimensions, the dimension identifier for the dimension, a set of possible values for the dimension in the data set, and, for each possible value in the set of possible values for the dimension, an identifier for the possible value;
    performing a second query against a data repository that is separate from the metadata repository to obtain data associated with the metric and the set of dimensions, wherein the data set comprises the data;
    applying a set of rules to the data set to obtain a deconstruction of the metric by grouping values for the metric in the data set according to the set of dimensions, wherein the deconstruction of the metric comprises a division of values for the metric into a plurality of subsets, each subset being associated with a dimension in the set of dimensions;
    displaying, at a graphical user interface for the computer, a first graphical report for the data set, the first graphical report including:
        a trend for the metric over a range of time specified via the graphical user interface;
        a set of user-selectable options, each of the user-selectable options corresponding to a different dimension in the set of dimensions;
        the deconstruction independently of a domain of the data set, wherein displaying the deconstruction comprises displaying, for each dimension in the set of dimensions, a chart that breaks down percentages of each of the possible values for the dimension; and
    in response to receiving a selection of one of the set of user-selectable options in the first graphical report for the data set:
        obtaining, from the data repository, a subset of the data set corresponding to the selected one of the set of user-selectable options,
        obtaining, from the metadata repository, metadata matching the subset of the data set corresponding to the selected one of the set of user-selectable options, and
        transitioning from the first graphical report to a second graphical report illustrating a breakdown of the subset of the data set corresponding to the selected one of the set of user-selectable options over the range of time, the breakdown of the subset of the data set comprising one or more of the plurality of subsets associated with each dimension corresponding to the selected option;
    receiving a second selection of a second option of the set of user-selectable options; and
    in response to receiving the second selection of one of the set of user-selectable options, adding, to the second graphical report, a breakdown of the possible values for the dimension corresponding to the second option, the breakdown of the possible values corresponding to the second option comprising one or more of the plurality of subsets associated with the dimension corresponding to the second option.

2. The computer-implemented method of claim 1, further comprising: updating the chart for one or more of the dimensions in the set of dimensions based on a change to the range of time specified via the graphical user interface.

3. The computer-implemented method of claim 2, wherein the time dimension is associated with one or more granularities.

4. The computer-implemented method of claim 1, wherein obtaining the data set and the metadata involves:
    obtaining the metric and the set of dimensions from the metadata; and
    obtaining the data set as data associated with the metric and the set of dimensions.

5. The computer-implemented method of claim 1, wherein at least one of the charts comprises at least one of:
    a line chart;
    a bar chart; and
    a pie chart.

6. The method of claim 1, wherein applying the set of rules to the data set to obtain the deconstruction further comprises using the rules to determine a percentage split of the metric along the set of dimensions for different granularities of time, wherein the metadata additionally comprises a grains sections that specifies the different granularities of time.

7. A system for processing data, comprising:
    a processor; and
    a memory having instructions thereon which, when executed by the processor, performs an operation comprising:
        receiving a request that includes information related to a data set;
        performing a first query against a metadata repository to obtain metadata matching the information, wherein the metadata comprises:
            a metrics section that comprises an identifier for a metric, the metric representing a measurable quantity in the data set, and a set of dimension identifiers, each of the dimension identifiers corresponding to a different dimension in a set of dimensions for the metric, wherein each of the different dimensions groups values for the metric in the data set, and wherein the set of dimensions does not include a time dimension; and a dimensions section that comprises, for each dimension in the set of dimensions, the dimension identifier for the dimension, a set of possible values for the dimension in the data set, and, for each possible value in the set of possible values for the dimension, an identifier for the possible value;

performing a second query against a data repository that is separate from the metadata repository to obtain data associated with the metric and the set of dimensions, wherein the data set comprises the data;

applying a set of rules to the data set to obtain a deconstruction of the metric by grouping values for the metric in the data set according to the set of dimensions, wherein the deconstruction of the metric comprises a division of values for the metric into a plurality of subsets, each subset being associated with a dimension in the set of dimensions;

displaying, at a graphical user interface for the computer, a first graphical report for the data set, the first graphical report including:

a trend for the metric over a range of time specified via the graphical user interface;

a set of user-selectable options, each of the user-selectable options corresponding to a different dimension in the set of dimensions;

the deconstruction independently of a domain of the data set, wherein displaying the deconstruction comprises displaying, for each dimension in the set of dimensions, a chart that breaks down percentages of each of the possible values for the dimension; and in response to receiving a selection of one of the set of user-selectable options in the first graphical report for the data set:

obtaining, from the data repository, a subset of the data set corresponding to the selected one of the set of user-selectable options, obtaining, from the metadata repository, metadata matching the subset of the data set corresponding to the selected one of the set of user-selectable options, and transitioning from the first graphical report to a second graphical report illustrating a breakdown of the subset of the data set corresponding to the selected one of the set of user-selectable options over the range of time, the breakdown of the subset of the data set comprising one or more of the plurality of subsets associated with each dimension corresponding to the selected option;

receiving a second selection of a second option of the set of user-selectable options; and in response to receiving the second selection of one of the set of user-selectable options, adding, to the second graphical report, a breakdown of the possible values for the dimension corresponding to the second option, the breakdown of the possible values corresponding to the second option comprising one or more of the plurality of subsets associated with the dimension corresponding to the second option.

8. The system of claim 7, wherein the presentation apparatus is further configured to: update the chart for one or more of the dimensions in the set of dimensions based on a change to the range of time specified via the graphical user interface.

9. The system of claim 7, wherein at least one of the charts comprises at least one of:

a line chart;

a bar chart; and a pie chart.

10. A non-transitory computer-readable storage medium storing instructions that when executed by a computer cause the computer to perform a method for providing data-model-driven visualization of data sets, the method comprising:

receiving a request that includes information related to a data set;

performing a first query against a metadata repository to obtain metadata matching the information, wherein the metadata comprises:

a metrics section that comprises an identifier for a metric, the metric representing a measurable quantity in the data set, and a set of dimension identifiers, each of the dimension identifiers corresponding to a different dimension in a set of dimensions for the metric, wherein each of the different dimensions groups values for the metric in the data set, and wherein the set of dimensions does not include a time dimension; and a dimensions section that comprises, for each dimension in the set of dimensions, the dimension identifier for the dimension, a set of possible values for the dimension in the data set, and, for each possible value in the set of possible values for the dimension, an identifier for the possible value;

performing a second query against a data repository that is separate from the metadata repository to obtain data associated with the metric and the set of dimensions, wherein the data set comprises the data;

applying a set of rules to the data set to obtain a deconstruction of the metric by grouping values for the metric in the data set according to the set of dimensions, wherein the deconstruction of the metric comprises a division of values for the metric into a plurality of subsets, each subset being associated with a dimension in the set of dimensions;

displaying, at a graphical user interface for the computer, a first graphical report for the data set, the first graphical report including:

a trend for the metric over a range of time specified via the graphical user interface;

a set of user-selectable options, each of the user-selectable options corresponding to a different dimension in the set of dimensions;

the deconstruction independently of a domain of the data set, wherein displaying the deconstruction comprises displaying, for each dimension in the set of dimensions, a chart that breaks down percentages of each of the possible values for the dimension; and in response to receiving a selection of one of the set of user-selectable options in the first graphical report for the data set:

obtaining, from the data repository, a subset of the data set corresponding to the selected one of the set of user-selectable options, obtaining, from the metadata repository, metadata matching the subset of the data set corresponding to the selected one of the set of user-selectable options, and transitioning from the first graphical report to a second graphical report illustrating a breakdown of the subset of the data set corresponding to the selected one of the set of user-selectable options over the range of time, the breakdown of the subset of the data set comprising one or more of the plurality of subsets associated with each dimension corresponding to the selected option;

receiving a second selection of a second option of the set of user-selectable options; and in response to receiving the second selection of one of the set of user-selectable options, adding, to the second graphical report, a breakdown of the possible values for the dimension corresponding to the second option, the breakdown of the possible values corresponding to the second option comprising one or more of the plurality of subsets associated with the dimension corresponding to the second option.

11. The computer-readable storage medium of claim 10, the method further comprising: updating the chart for one or more of the dimensions in the set of dimensions based on a change to the range of time specified via the graphical user interface.

12. The computer-readable storage medium of claim 10, wherein at least one of the charts comprises at least one of:

a line chart;

a bar chart; and a pie chart.

\* \* \* \* \*